United States Patent
Tan et al.

(10) Patent No.: US 11,292,125 B2
(45) Date of Patent: Apr. 5, 2022

(54) LOW-BACK-CLEARANCE ROBOT SPEED REDUCER

(71) Applicant: SHENZHEN LLMACHINECO., LTD, Shenzhen (CN)

(72) Inventors: Jun Tan, Shenzhen (CN); Xianhong Cao, Shenzhen (CN)

(73) Assignee: SHENZHEN LLMACHINECO., LTD., Shenzhen (CN)

( * ) Notice: Subject to any disclaimer, the term of this patent is extended or adjusted under 35 U.S.C. 154(b) by 609 days.

(21) Appl. No.: 16/083,472

(22) PCT Filed: Oct. 31, 2016

(86) PCT No.: PCT/CN2016/000594
§ 371 (c)(1),
(2) Date: Sep. 7, 2018

(87) PCT Pub. No.: WO2017/156651
PCT Pub. Date: Sep. 21, 2017

(65) Prior Publication Data
US 2019/0061146 A1 Feb. 28, 2019

(30) Foreign Application Priority Data
Mar. 12, 2016 (CN) .......................... 201610140074.4

(51) Int. Cl.
*F16H 1/32* (2006.01)
*B25J 9/10* (2006.01)
(Continued)

(52) U.S. Cl.
CPC ............... *B25J 9/102* (2013.01); *F16C 23/10* (2013.01); *F16H 1/32* (2013.01); *F16H 21/18* (2013.01);
(Continued)

(58) Field of Classification Search
CPC .............. B25J 9/102; F16H 1/32; F16H 21/18
See application file for complete search history.

(56) References Cited

U.S. PATENT DOCUMENTS 5,908,372 A * 6/1999 Janek ........................ F16H 1/32
477/162
5,954,609 A * 9/1999 Fecko ....................... F16H 1/32
475/162
(Continued)

FOREIGN PATENT DOCUMENTS

CN    101907149 A    12/2010
CN    102003500 A     4/2011
(Continued)

OTHER PUBLICATIONS

International Search Report for International Application No. PCT/CN2016/000594, dated Feb. 6, 2017.

*Primary Examiner* — William C Joyce

(57) ABSTRACT

A low-back-clearance robot speed reducer includes a wheel holder (16), a pin gear shell (1), a first cycloidal wheel (6), a roller pin (8), a second cycloidal wheel (11), a gland (2), an elastic member (9), a first cross-shaped slider (5), a second cross-shaped slider (13) and a crankshaft (10). The first cycloidal wheel (6) and the second cycloidal wheel (11) are in a phase relation of 180 degrees and have a multi-point engagement transmission relationship with the pin gear shell (1) and the roller pin (8). The first cross-shaped slider (5) and the second cross-shaped slider (13) form a double cross-shaped slider structure, in which the groove profile of the sliders is of a trapezoidal groove structure. A clearance is automatically axially compensated by the elastic member (9). The center of rotation of the crankshaft (10) is coaxial with the wheel holder (16) and the gland (2).

8 Claims, 2 Drawing Sheets

(51) Int. Cl.
- *F16H 57/021* (2012.01)
- *F16C 23/10* (2006.01)
- *F16H 21/18* (2006.01)
- *F16H 57/04* (2010.01)
- *F16C 9/02* (2006.01)
- *F16H 1/24* (2006.01)

(52) U.S. Cl.
CPC ....... *F16H 57/021* (2013.01); *F16H 57/0412* (2013.01); *F16C 9/02* (2013.01); *F16H 1/24* (2013.01)

(56) References Cited

U.S. PATENT DOCUMENTS

| | | | | |
|---|---|---|---|---|
| 8,403,789 B2 * | 3/2013 | Janek | ................... | F16H 57/082 |
| | | | | 475/116 |
| 9,074,660 B2 * | 7/2015 | Janek | ....................... | F16H 1/32 |
| 10,184,547 B2 * | 1/2019 | Fecko | ...................... | F16H 1/32 |
| 2015/0354667 A1 * | 12/2015 | Tesar | ..................... | F16H 57/08 |
| | | | | 475/180 |

FOREIGN PATENT DOCUMENTS

| | | |
|---|---|---|
| CN | 104500660 A | 4/2015 |
| CN | 104736888 A | 6/2015 |
| CN | 105156592 A | 12/2015 |
| CN | 105570437 A | 5/2016 |
| CN | 205715575 U | 11/2016 |
| DE | 102008036743 A1 | 2/2010 |
| JP | H0665653 U | 9/1994 |
| JP | 2012202457 A | 10/2012 |
| JP | 2013514500 A | 4/2013 |
| WO | 2008052691 A1 | 5/2008 |

\* cited by examiner

LOW-BACK-CLEARANCE ROBOT SPEED REDUCER

CROSS-REFERENCE TO RELATED APPLICATIONS

The present specification is a U.S. National Stage of International Patent Application No. PCT/CN2016/000594 filed Oct. 31, 2016, which claims priority to and the benefit of Chinese Patent Application No. 201610140074.4, filed in the Chinese Intellectual Property Office on Mar. 12, 2016, the entire contents of which are incorporated herein by reference.

TECHNICAL FIELD

The present invention relates to a speed reducer, and more particularly, to a low-back-clearance robot speed reducer.

BACKGROUND

In most of the existing robot speed reducer, harmonic speed reducer, RV reducer, etc. are applied. The harmonic speed reducer has a poor rigidity than those of the RV speed reducer, and thus cannot provide a feature of high rigidity. The existing RV speed reducers are all implemented by a double crankshaft two-stage transmission structure, which belongs to a two-stage transmission. One of the two stage transmissions is obtained by using a gear transmission. The disadvantages of the gear transmission may lie in that there may be a large vibration and a great noise when the gear is engaged at a high speed, and also, a certain clearance is needed. The bearing of the internal double crankshaft would be affected by the clearance. Thus, even small pin bearings are needed, whose end play may be regarded as a main source of the back clearance.

With the development, currently, the running speed of the robot is needed to become faster, and the input speed of the reducer thereof is needed to b become higher. However, in the conventional RV reducer, a gear transmission is used as the first stage transmission, which suffers the disadvantage of great vibration noise at a high speed. Further, the small bearing of the double crankshaft would also generate a larger amount of heat, thus affecting the lifetime of the entire reducer. Also, it is needed to provide the first stage of gear engagement with certain clearance. Besides, the end play of the double crankshaft bearing may greatly influence the back clearance of the entire reducer, and the back clearance cannot be automatically compensated.

SUMMARY

The technical problem to be solved by the present invention is to provide a low-back-clearance robot speed reducer. In the low-back-clearance robot speed reducer, a central crankshaft is used directly, so as to facilitate the installation of a larger crankshaft and a larger bearing, thereby reducing heat generation and facilitating an increased running speed. The torque driven by the cycloidal pin gear of the low-back-clearance robot speed reducer is output through a double-cross-shaped slider structure. In the low-back-clearance robot speed reducer, the clearance of the cross-shaped slider may be axially and automatically compensated through an elastic member.

The present invention is achieved by the following technical solutions. A low-back-clearance robot speed reducer includes a wheel holder, a pin gear shell, a first cycloidal wheel, a roller pin, a second cycloidal wheel, a gland, an elastic member, a first cross-shaped slider, a second cross-shaped slider and a crankshaft. The gland and the wheel holder are fixed and connected to form one body.

A first main bearing is installed between the gland and the pin gear shell and a second main bearing is installed between the wheel holder and the pin gear shell. The gland is fixed together with the wheel holder. A first crankshaft bearing is installed between one side of a central shaft of the crankshaft and the gland, and a second crankshaft bearing is installed between the other side of central shaft of the crankshaft and the wheel holder.

A first eccentric portion bearing is installed between a first eccentric portion of the crankshaft and the first cycloidal wheel, with the first cycloidal wheel being fixedly connected with an outer ring of the first eccentric portion bearing. An elastic member is installed between an inner ring of the first eccentric portion bearing and a shoulder of the crankshaft. A second eccentric portion bearing is installed between a second eccentric portion of the crankshaft and the second cycloidal wheel, with the second cycloidal wheel being fixedly connected with an outer ring of the second eccentric portion bearing.

As a preferred technical solution, trapezoidal grooves are provided inside of the gland and the wheel holder, trapezoidal protrusions are provided outside of the first and the second cycloidal wheels. Trapezoidal protrusions are provided on one surfaces of the first and the second cross-shaped sliders while trapezoidal grooves are provided on the other surface thereof. Directions of the trapezoidal protrusions and the trapezoidal grooves form in a cross shape. The trapezoidal protrusions are embedded into the trapezoidal grooves, and a gap between the trapezoidal protrusions and trapezoidal grooves is compensated automatically by an elastic member.

As a preferred technical solution, trapezoidal angles of the trapezoidal groove and the trapezoidal protrusion are designed to form a self-locking structure.

As a preferred technical solution, the number of the roller pin on the inside the pin gear shell is one more than those of the teeth of the first cycloidal wheel or the second cycloidal wheel.

As a preferred technical solution, the first and the second cycloidal wheels are provided with same shapes, and are installed in a back-to-back manner with a phase relation of 180 degrees.

As a preferred technical solution, the gland, the first cross-shaped slider and the first cycloidal wheel form a first cross-shaped slider mechanism.

As a preferred technical solution, the wheel holder, the second cross-shaped slider and the second cycloidal wheel form a second cross-shaped slider mechanism.

As a preferred technical solution, the first cycloidal wheel, the second cycloidal wheel, the pin gear shell, the crankshaft and the roller pin form a cycloidal pin wheel mechanism.

The invention may achieve the following beneficial effects. The size of the crankshaft according to the invention may be designed to be relatively large, and it is possible to accordingly select a deep groove ball bearing with good rotation characteristics as the eccentric portion bearing used therein, thereby facilitating the reducing of heat generation and the improving the crankshaft running speed. Therefore, the problem of heat generation of the double crankshaft is solved.

BRIEF DESCRIPTION OF THE DRAWINGS

In order to illustrate the embodiments of the present invention or the technical solutions of the prior art more clearly, the drawings will be briefly described below, which may be used in describing the embodiments of the present invention or in describing the prior art. Obviously, the drawings described below are only some embodiments of the present invention, and other drawings may be obtained by those skilled in the art without any creative effort.

In the figures: 1. a pin gear shell, 2. a gland, 3. a first main bearing, 4. a first crankshaft bearing, 5. a first cross-shaped slider, 6. a first cycloidal wheel, 7. a first eccentric portion bearing, 8. a roller pin, 9. an elastic member, 10. a crankshaft, 11. a second cycloidal wheel, 12. a second eccentric portion bearing, 13. a second cross-shaped slider, 14. a second main bearing, 15. a second crankshaft bearing, 16. a wheel holder.

DETAILED DESCRIPTION

All of the features disclosed in this specification, or steps in all methods or processes disclosed, may be combined in any manner, other than mutually exclusive features and/or steps.

Any feature disclosed in the specification, including any following claims, abstract and drawings, may be replaced by other equivalent or alternative features with similar propose, unless specifically stated. That is, each feature is only one example of a series of equivalent or similar features, unless specifically stated.

Figure 1:
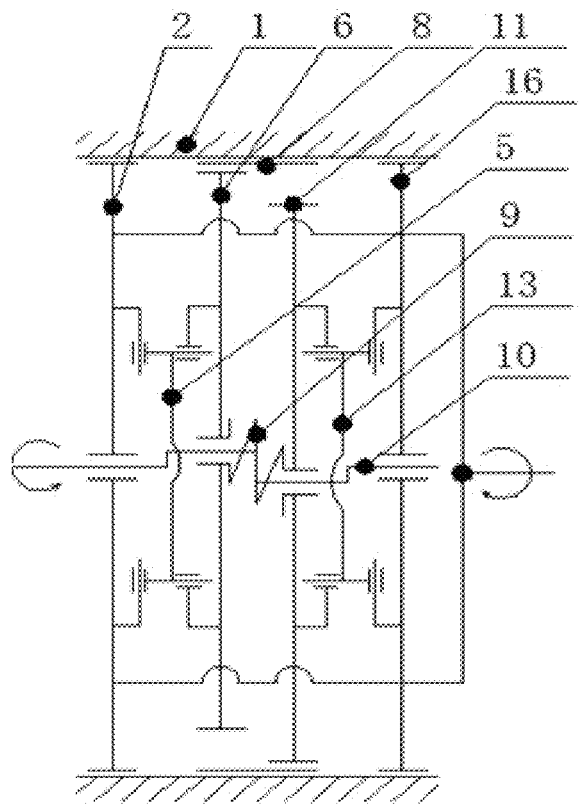
FIG. 1 is a schematic diagram of the present invention.
Figure 2:
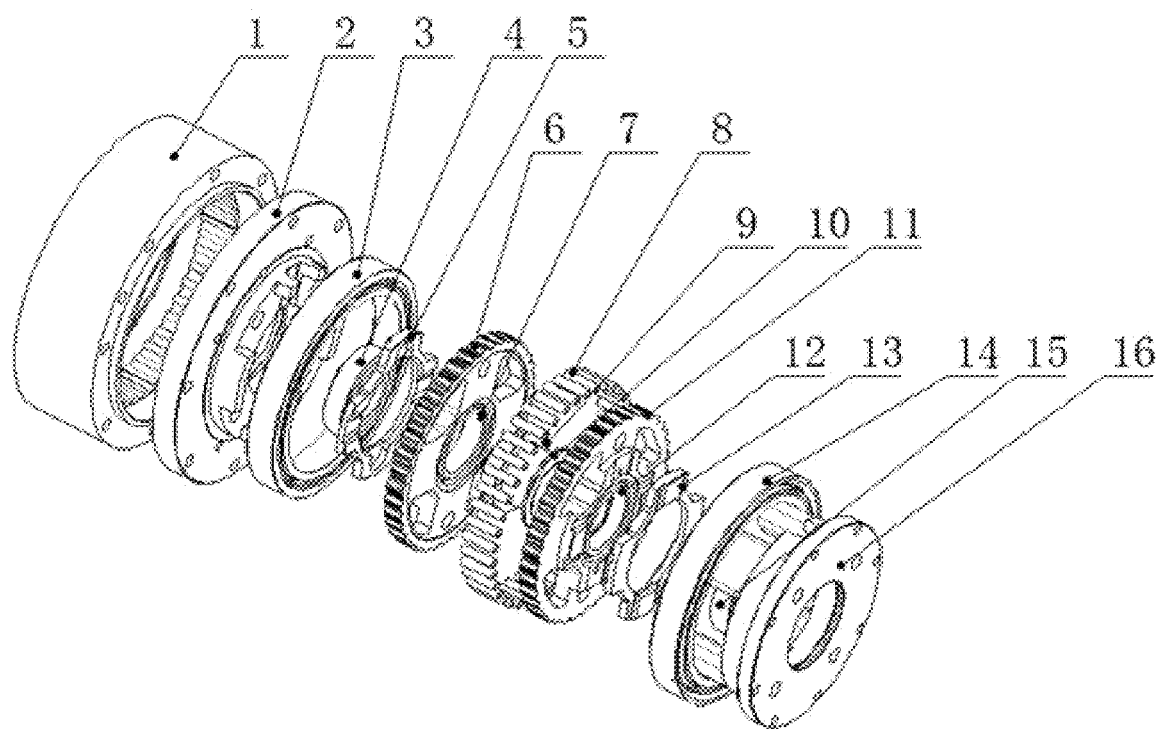
FIG. 2 is an exploded schematic view showing the structure of the present invention.

As shown in FIG. 1 and FIG. 2, a low-back-clearance robot speed reducer according to the present invention includes a wheel holder, a pin gear shell, a first cycloidal wheel, a roller pin, a second cycloidal wheel, a gland, an elastic member, a first cross-shaped slider, a second cross-shaped slider and a crankshaft.

The gland 2, the first cross-shaped slider 5 and the first cycloidal wheel 6 form a first cross-shaped slider mechanism. The wheel holder 16, the second cross-shaped slider 13 and the second cycloidal wheel 11 form a second cross-shaped slider mechanism. The first cycloidal wheel 6, the second cycloidal wheel 11, the pin gear shell 1, the crankshaft 10 and the roller pin 8 form a cycloidal pin wheel mechanism.

Figure 4:
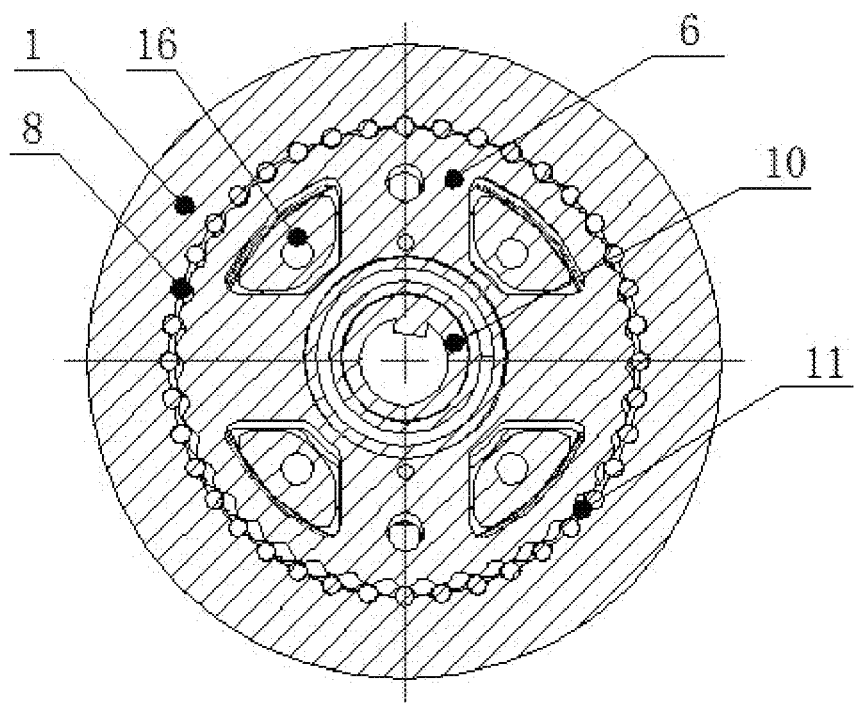
FIG. 4 is a front cross-sectional view of the present invention.

As shown in FIG. 4, the number of the pins 8 on the inner side of the pin gear shell 1 is one more than those of teeth of the first cycloidal wheel 6 or the second cycloidal wheel 11. When the single crankshaft 10 rotates one round, the first cycloidal wheel 6 and the second cycloidal wheel 11 perform an eccentric movement of one round, while being in contact with the roller pin 8. As a result, the first cycloidal wheel 6 and the second cycloidal wheel 11 are rotated by one tooth distance in a opposite direction to the crankshaft 10.

The outer tooth profile of the first cycloidal wheel 6 or the second cycloidal wheel 11 is a standard cycloid curve, obtained by the center-to-center radius of the inner semi-circular hole of the pin gear shell 1, the radius of the roller pin 8, and the eccentricity of the crankshaft 10. In theory, the shape of a single curve is tangential to all the roller pins 8, thereby achieving multi-point engagement, featuring with large overlap, low-back-clearance, and high rigidity.

Figure 3:
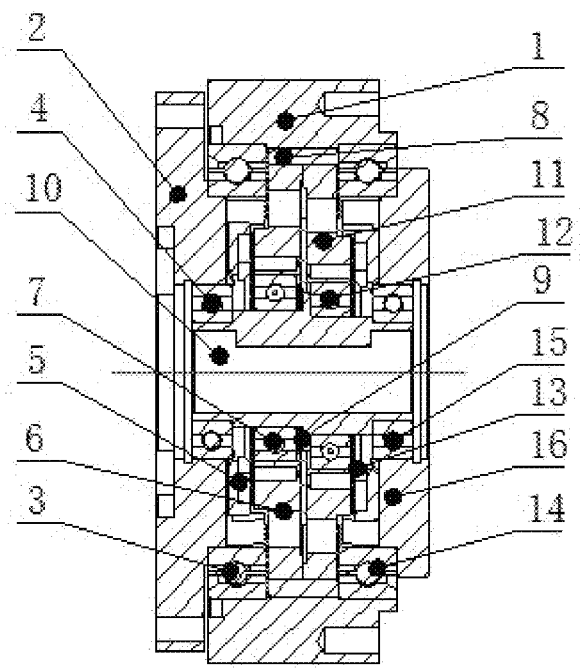
FIG. 3 is a side cross-sectional view of the present invention.

As shown in FIG. 2 and FIG. 3, a first main bearing 3 is installed between the gland 2 and the pin gear shell 1, and a second main bearing 14 is installed between the wheel holder 16 and the pin gear shell 1. The gland 2 is fixedly connected with the wheel holder 16. A first crankshaft bearing is installed between the central shaft side of the crankshaft 10 and the gland 2, and a second crankshaft bearing 15 is installed between the other side of the crankshaft 10 and the wheel holder 16. A first eccentric portion bearing 7 is installed between a first eccentric portion of the crankshaft 10 and the first cycloidal wheel 6, with the first cycloidal wheel 6 being fixedly connected to the outer ring of the bearing 7 of the first eccentric portion. An elastic member 9 is installed between the inner ring of the first eccentric portion bearing 7 and the shoulder of the crankshaft 10. A second eccentric portion bearing 12 is installed between the second eccentric portion of the crankshaft 10 and the second cycloidal wheel 11, with the second cycloidal wheel 11 being fixedly connected to the outer ring of the bearing 12 of the second eccentric portion.

In this embodiment, the insides of the gland 2 and the wheel holder 16 are provided with trapezoidal grooves, and outsides of the first cycloidal wheel 6 and the second cycloidal wheel 11 are provided with trapezoidal protrusions. The first cross-shaped slider 5 and the second cross-shaped slider 13 are provided with trapezoidal protrusions on one surface thereof, and provided with trapezoidal grooves on the other surface thereof. The trapezoidal protrusions and the trapezoidal grooves have a cross shape. The trapezoidal protrusions are embedded into the trapezoidal grooves and may slide along the extending direction of the trapezoidal groove. The clearance between the trapezoidal protrusion and the trapezoidal groove is automatically compensated by the elasticity of the elastic member 9.

Furthermore, the trapezoidal angle of the trapezoidal grooves and the trapezoidal protrusions may be designed to form a self-locking, so that the clearance compensated by the elastic member 9 is irreversible. Therefore, the rotational back clearance of the gland 2 relative to the first cycloidal wheel 6 is zero, and the rotational back clearance of the wheel holder 16 relative to the second cycloidal wheel 11 is also zero. Thus, one stage transmission of a single crankshaft is obtained through a cross-shaped sliding groove structure, meanwhile zero back clearance output is obtained.

The invention applies a single crankshaft eccentric motion. The crankshaft rotates to provide an eccentric motion, whose rotation center is coaxial with the wheel holder and the gland. The crankshaft may be a hollow keyway structure, and the gland has a threaded hole which can be used for the installation of motor, thus ensuring the compactness of the entire structure. As for the conventional RV reducer, the diameter size of the crankshaft need to be small due to the impact of space, and it is even needed to use the pin bearing without inner and outer rings as the bearing of the eccentric portion. The process and performance of the conventional RV reducer all suffer certain disadvantages. The heat generation caused by high-speed rotation requires that, the maximum rotation speed of the crankshaft does not exceed 1000 r/min, otherwise it will degrade the life of the reducer. However, the size of the crankshaft according to the present invention may be designed to be relatively large, and it is possible to accordingly select a deep groove ball bearing with good rotation as the eccentric portion bearing used therein. Therefore, it is beneficial to reduce heat generation, improve the running speed of the crankshaft, and solve the heat generation problem of the double crankshaft.

The above is only specific embodiments of the present invention, but the scope of the present invention is not limited thereto. Any changes or substitutions, which may be obtained without any creative effort, should be all included in the scope of the present invention. Therefore, the scope of the invention should be defined by the appended claims.

What is claimed is:

1. A low-back-clearance robot speed reducer, characterized in that, the reducer comprises a wheel holder, a pin gear shell, a first cycloidal wheel, a roller pin, a second cycloidal wheel, a gland, an elastic member, a first cross-shaped slider, a second cross-shaped slider and a crankshaft, and the gland and the wheel holder are fixed and connected to form one body;

a first main bearing is installed between the gland and the pin gear shell, a second main bearing is installed between the wheel holder and the pin gear shell, the gland is fixed together with the wheel holder, a first crankshaft bearing is installed between one side of a central shaft of the crankshaft and the gland, and a second crankshaft bearing is installed between the other side of the central shaft of the crankshaft and the wheel holder; and a first eccentric portion bearing is installed between a first eccentric portion of the crankshaft and the first cycloidal wheel with the first cycloidal wheel being fixedly connected with an outer ring of the first eccentric portion bearing, the elastic member is installed between an inner ring of the first eccentric portion bearing and a shoulder of the crankshaft, a second eccentric portion bearing is installed between a second eccentric portion of the crankshaft and the second cycloidal wheel with the second cycloidal wheel being fixedly connected with an outer ring of the second eccentric portion bearing, wherein trapezoidal grooves are provided inside of the gland and the wheel holder, trapezoidal protrusions are provided outside of the first and the second cycloidal wheels, trapezoidal protrusions are provided on one surfaces of the first and the second cross-shaped sliders while trapezoidal grooves are provided on the other surface thereof, directions of the trapezoidal protrusions and the trapezoidal grooves form in a cross shape, the trapezoidal protrusions are embedded into the trapezoidal grooves, and a gap between the trapezoidal protrusions and trapezoidal grooves is compensated automatically by the elastic member.

2. The low-back-clearance robot speed reducer according to claim 1, characterized in that, trapezoidal angles of the trapezoidal groove and the trapezoidal protrusion are designed to form a self-locking structure.

3. The low-back-clearance robot speed reducer according to claim 1, characterized in that, the number of the roller pin on the inside the pin gear shell is one more than those of the teeth of the first cycloidal wheel or the second cycloidal wheel.

4. The low-back-clearance robot speed reducer according to claim 1, characterized in that, the first and the second cycloidal wheels are provided with same shapes, and are installed in a back-to-back manner with a phase relation of 180 degrees.

5. The low-back-clearance robot speed reducer according to claim 1, characterized in that, the gland, the first cross-shaped slider and the first cycloidal wheel form a first cross-shaped slider mechanism.

6. The low-back-clearance robot speed reducer according to claim 5, characterized in that, the wheel holder, the second cross-shaped slider and the second cycloidal wheel form a second cross-shaped slider mechanism.

7. The low-back-clearance robot speed reducer according to claim 1, characterized in that, the first cycloidal wheel, the second cycloidal wheel, the pin gear shell, the crankshaft and the roller pin form a cycloidal pin wheel mechanism.

8. A low-back-clearance robot speed reducer, comprising a wheel holder, a pin gear shell, a first cycloidal wheel, roller pins, a second cycloidal wheel, a gland, an elastic member, a first cross-shaped slider, a second cross-shaped slider, and a crankshaft, wherein:

the gland and the wheel holder are fixedly connected into a whole;

a first main bearing is disposed between the gland and the pin gear shell, a second main bearing is disposed between the wheel holder and the pin gear shell, the gland and the wheel holder are fixedly connected, a first crankshaft bearing is disposed between a side of a central axis of the crankshaft and the gland, and a second crankshaft bearing is disposed between another side of the central axis of the crankshaft and the wheel holder;

a first eccentric part bearing is disposed between a first eccentric part of the crankshaft and the first cycloidal wheel, the first cycloidal wheel is fixedly connected to an outer ring of the first eccentric part bearing, the elastic member is disposed between an inner ring of the first eccentric part bearing and a shoulder of the crankshaft, a second eccentric part bearing is disposed between a second eccentric part of the crankshaft and the second cycloidal wheel, the second cycloidal wheel is fixedly connected to an outer ring of the second eccentric part bearing, trapezoidal grooves are formed in inner sides of the gland and the wheel holder, trapezoidal protrusions are disposed on outer sides of the first cycloidal wheel and the second cycloidal wheel;

trapezoidal protrusions are disposed on a side of the first cross-shaped slider and a side of the second cross-shaped slider, trapezoidal grooves are formed in another side of the first cross-shaped slider and another side of the second cross-shaped slider, the trapezoidal protrusions and the trapezoidal grooves are in a direction of a cross shape, the trapezoidal protrusions are embedded into the trapezoidal grooves, a clearance between the trapezoidal protrusions and the trapezoidal grooves is automatically compensated for by the elastic member, and angles of the trapezoidal grooves and the trapezoidal protrusions are designed to form a self-lock structure;

the number of the roller pins on an inner side of the pin gear shell is one greater than the number of teeth of the first cycloidal wheel and the second cycloidal wheel;

the cycloidal wheel and the second cycloidal wheel are in a same shape, are mounted back-to-back, and are in a phase relation of 180°; the gland, the first cross-shaped slider, and the first cycloidal wheel constitute a first cross-shaped slider mechanism; the wheel holder, the second cross-shaped slider, and the second cycloidal wheel constitute a second cross-shaped slider mechanism; and the first cycloidal wheel, the second cycloidal wheel, the pin gear shell, the crankshaft, and the roller pins constitute a cycloidal pinwheel mechanism.

* * * * *